(12) United States Patent
Iseki et al.

(10) Patent No.: US 7,871,557 B2
(45) Date of Patent: Jan. 18, 2011

(54) METHOD FOR PRODUCING AN EXTRUDED MOLDED ARTICLE OF ETHYLENE POLYMER AND THE FILM

(75) Inventors: Yuki Iseki, Sodegaura (JP); Kenzo Chikanari, Ichihara (JP); Yasuro Suzuki, Kisarazu (JP)

(73) Assignee: Sumitomo Chemical Company, Ltd., Osaka (JP)

( * ) Notice: Subject to any disclaimer, the term of this patent is extended or adjusted under 35 U.S.C. 154(b) by 0 days.

(21) Appl. No.: 10/947,540

(22) Filed: Sep. 23, 2004

(65) Prior Publication Data

US 2005/0098927 A1    May 12, 2005

(30) Foreign Application Priority Data

Sep. 26, 2003  (JP)  ............................. 2003-335345
Sep. 26, 2003  (JP)  ............................. 2003-335893
Sep. 26, 2003  (JP)  ............................. 2003-335894

(51) Int. Cl.
*C08F 8/00*  (2006.01)

(52) U.S. Cl. ...................... 264/464; 526/348.1; 524/523

(58) Field of Classification Search ................ 264/464; 526/348.1; 524/543

See application file for complete search history.

(56) References Cited

U.S. PATENT DOCUMENTS

| 5,374,700 | A |  | 12/1994 | Tsutsui et al. |
| 5,840,815 | A |  | 11/1998 | Tsutsui et al. |
| 5,883,205 | A |  | 3/1999 | Tsutsui et al. |
| 6,794,029 | B2 | * | 9/2004 | Watanabe et al. ........... 428/336 |
| 6,867,277 | B2 | * | 3/2005 | Iseki ........................ 526/348.3 |
| 6,870,015 | B2 |  | 3/2005 | Oshima et al. |

FOREIGN PATENT DOCUMENTS

| EP | 0 640 627 |  | 8/1993 |
| EP | 0 640 627 | A1 * | 3/1995 |
| EP | 1 086 963 | A1 * | 3/2001 |
| JP | 57-126809 | A | 8/1982 |
| JP | 04-213309 | A | 8/1992 |
| JP | 06-166724 | A | 6/1994 |
| JP | 06-207057 | A | 7/1994 |
| JP | 06-287229 | A | 10/1994 |
| JP | 07-062031 |  | 3/1995 |
| JP | 07-309908 | A | 11/1995 |
| JP | 08-048711 | A | 2/1996 |
| JP | 08-073535 | A | 3/1996 |
| JP | 10-195263 | A | 7/1998 |
| JP | 10-251334 | A | 9/1998 |
| JP | 10-329195 |  | 12/1998 |
| JP | 11-248046 | A | 9/1999 |
| JP | 11-292933 | A | 10/1999 |
| JP | 2000-129044 | A | 5/2000 |
| JP | 2002-179856 | A | 6/2002 |
| JP | 2002-249518 | A | 9/2002 |
| JP | 2005-068170 | A | 3/2003 |
| JP | 203-096133 | A | 4/2003 |
| JP | 2005-097522 | A | 4/2005 |

* cited by examiner

*Primary Examiner*—Robert D. Harlan
(74) *Attorney, Agent, or Firm*—Fitch, Even, Tabin & Flannery

(57) ABSTRACT

The object is to provide a method for producing a film excellent in a quality of odorless or free from deteriorating taste of food contained in a package of the extruded molded article by using an ethylene-α-olefin copolymer excellent in extrusion molding processability. This object is achieved by a method for producing an extruded molded article comprising a step of extruding a copolymer of ethylene and α-olefin of from 3 to 20 carbon atoms having an activation energy for melt flow of not less than 50 kJ/mol under one of the following conditions:

(a) a temperature of melted resin at die gap of T-die is not more than 200° C.,
(b) a temperature of melted resin at die gap of tubular tie is not more than 170° C.

11 Claims, No Drawings

METHOD FOR PRODUCING AN EXTRUDED MOLDED ARTICLE OF ETHYLENE POLYMER AND THE FILM

This U.S. application claims the priority benefits under 35 U.S.C. §119 of JP 2003-335345, 2003-335894 and 2003-335893, filed Sep. 26, 2003, the complete disclosures of which are incorporated herein by reference.

FIELD OF THE INVENTION

The present invention relates to a method for producing an extruded molded article obtained by molding an ethylene-α-olefin copolymer with T-die or tubular die. Further in detail, the present invention relates to a method for producing an extruded molded article of an ethylene-α-olefin copolymer excellent in balance between extrusion molding processability and a quality of odorless or free from deteriorating taste of food contained in a package of the extruded molded article of the ethylene copolymer, and also relates to the extruded molded article thereof.

BACKGROUND OF THE INVENTION

Ethylene polymers are conventionally used in a lot of fields, for example, used in extrusion molded articles such as films, sheets and the like. Extrusion molded articles are required to be excellent in molding processability controlled by extrusion torque, melt tension and the like, and further, required to be odorless and no to deteriorate taste of food contained in a package thereof.

A film of ethylene polymer or a composition containing ethylene polymer is usually produced by a flat (T-die) molding process or tubular molding process. While, in a tubular molding process, a temperature of a melted resin at die gap of the tubular die is usually between 180° C. and 220° C., a temperature of a melted resin at die gap of the T-die is usually between 220° C. and 260° C. in a T-die molding process due to a large pressure loss at the die.

Such high temperature at die gap causes a generation of order of film resulting from oxidizing resin, a increase of number of gels (fish-eyes) resulting from thermal degradation or cross-linkage of resin, and a staining of a molding machine resulting from accumulation of the oxidized resin.

For example, Japanese Patent Application No. 10-329195A describes a method of molding a specific ethylene polymer or a resin composition containing the specific ethylene polymer into a film at low temperature. This method may not necessarily satisfy the requirements regarding the balance between their processability and odorless or free from deteriorating taste of food contained in a package of the extruded molded article thereof, and there has been desired further improvement.

For example, Japanese Patent Application No. 4-213309A describes an ethylene copolymers comprising a repeating unit derived from ethylene and a repeating unit derived from an α-olefin having 3 to 20 carbon atoms, wherein the density is from 0.86 to 0.95 g/cm$^3$, MFR is from 0.001 to 50 g/10 minutes, the melt tension and MFR satisfy a specific relation, and the temperature at the position of the maximum peak of a heat absorption curve measured by DSC, and the density satisfy a specific relation, as an example of ethylene copolymers excellent in melt tension and having narrow composition distribution.

The above-mentioned ethylene copolymers described in JP. 4-213309A has high melt tension, however, they may not necessarily satisfy the requirements regarding the balance between their processability and odorless or free from deteriorating taste of food contained in a package of the extruded molded article thereof.

Therefore, there has been desired further improvement in the extrusion molding processability of an ethylene copolymer and a quality of odorless or free from deteriorating taste of food contained in a package of the extruded molded article of the ethylene copolymer.

The object of the present invention is to provide a method for producing a film excellent in a quality of odorless or free from deteriorating taste of food contained in a package of the extruded molded article by using an ethylene-α-olefin copolymer excellent in extrusion molding processability. Further, the object of the present invention is to provide a film containing smaller amount of additives conventionally used by using an ethylene-α-olefin copolymer excellent in extrusion molding processability.

SUMMARY OF THE INVENTION

The present inventors have investigated under the conditions as described above, and resultantly, completed the invention.

That is, the present invention is to provide a method for producing an extruded molded article comprising a step of extruding a copolymer of ethylene and α-olefin of from 3 to 20 carbon atoms having an activation energy for melt flow of not less than 50 kJ/mol under one of the following conditions:
(a) a temperature of melted resin at die gap of T-die is not more than 200° C.,
(b) a temperature of melted resin at die gap of tubular tie is not more than 170° C.

Further, present invention is to provide an extruded molded article comprising a copolymer of ethylene and α-olefin of from 3 to 20 carbon atoms having an activation energy for melt flow of not less than 50 kJ/mol, and being substantially free from at least one of an antioxidant and a hydrochloric acid absorbing agent.

DETAILED DESCRIPTION OF THE PREFERABLE EMBODIMENT

The ethylene-α-olefin copolymer used in the present invention is an ethylene-α-olefin copolymer comprising a repeating unit derived from ethylene and a repeating unit derived from an α-olefin having 3 to 20 carbon atoms.

Examples of the α-olefin having 3 to 20 carbon atoms include propylene, 1-butene, 4-methyl-1-pentene, 1-hexene, 1-octene, 1-decene and the like. More preferable are 4-methyl-1-pentene and 1-hexene.

The content of the repeating unit derived from ethylene is from 50 to 99 wt % based on the total weight (100 wt %) of an ethylene-α-olefin copolymer. The content of the repeating unit derived from an α-olefin having 3 to 20 carbon atoms is from 1 to 50 wt % based on the total weight (100 wt %) of an ethylene-α-olefin copolymer.

The ethylene-α-olefin copolymer of the present invention may also contain repeating units derived from other than ethylene and α-olefin having 3 to 20 carbon atoms. Examples of other monomers include conjugated dienes (for example, butadiene, isoprene), non-conjugated dienes (for example, 1,4-pentadiene), acrylic acid, acrylates (for example, methyl acrylate, ethyl acrylate), methacrylic acid, methacrylates (for example, methyl methacrylate, ethyl methacrylate), vinyl acetate and the like.

The ethylene-α-olefin copolymer in the present invention is preferably a copolymer of ethylene and α-olefin of 4 to 10 carbon atoms, more preferably a copolymer of ethylene and α-olefin of 5 to 10 carbon atoms, and further preferably a copolymer of ethylene and α-olefin of 6 to 10 carbon atoms. Examples of ethylene-α-olefin copolymer include ethylene-1-hexene copolymer, ethelene-4-methyl-1-pentene copolymer and ethylene-1-octene copolymer, and among them, ethylene-1-hexene copolymer is preferable. Further, copolymers of ethylene, α-olefin of 6 to 10 carbon atoms and 1-butene is preferable, and include ethylene-1-butene-1-hexene copolymer, ethylene-1-butenen-4-methyl-1-pentene copolymer and ethylene-1-butene-1-octene copolymer. Among them, ethylene-1-butene-1-hexene copolymer is preferable.

The ethylene-α-olefin copolymer of the present invention has a melt flow rate (MFR; unit is g/10 minutes) of usually from 0.01 to 100 g/10 minutes, preferably from 0.05 to 20 g/10 minutes, more preferably from 0.1 to 10 g/10 minutes, further preferably from 0.1 to 6 g/60 minutes.

The melt flow rate (MFR; unit is g/10 minutes) is measured under a load of 21.18 N (2.16 Kg) at 190° C. according to a method defined by JIS K7210-1995. When MFR is measured, a polymer to which antioxdant has been previously added is preferably used.

The density of the ethylene-α-olefin copolymer used in the present invention is usually from 890 to 970 kg/cm$^3$ and a value measured according to a method defined in JIS K6760-1981. The above-mentioned density is preferably from 905 to 940 kg/m$^3$, more preferably from 907 to 930 kg/m$^3$ from the viewpoint of balance of the rigidity and impact strength of a film obtained from the ethylene-α-olefin copolymer of the present invention.

The copolymer of ethylene and α-olefin preferably used in the present invention is a copolymer having high melt tension, such as a copolymer having long-chain branches. Such copolymer has a higher activation energy for melt flow than the conventional linear ethylene-α-olefin copolymers.

The activation energy (Ea; unit is kJ/mol) for melt flow of the ethylene-α-olefin copolymer in the present invention is not less than 50 kJ/mol. Ea of the conventional ethylene-α-olefin copolymers is usually less than 50 kJ/mol and their extrusion molding processability is not excellent because an extrusion torque of the copolymers increase, or stable molding is not attained.

Preferable Ea of the ethylene-α-olefin copolymer in the present invention is not less than 50 kJ/mol, further preferable is not less than 60 kJ/mol. From the viewpoint of suppressing deterioration of appearance due to roughing the surface of the extruded molded article such as film, Ea is usually not more than 100 kJ/mol, preferably not more than 90 kJ/mol.

The above-mentioned activation energy (Ea) for melt flow is a numerical value calculated according to the Arrhenius type equation of the following shift factor ($a_T$). The shift factor ($a_T$) is obtained from creating a master-curve showing a dependency of dynamic viscosity (η; Pa/sec) on a share rate (ω;rad/sec) by shifting dynamic viscoelasticity data measured at 130° C., 150° C., 170° C. and 190° C. Ea is used as an index for molding processability.

Arrhenius type equation of shift factor ($a_T$)

$$\log(a_T) = Ea/R(1/T - 1/T_0)$$

(R is a gas constant, and $T_0$ is a standard temperature (463 K)).

A preferable ethylene-α-olefin copolymer in the present invention is such one that has MFR and melt viscosity (η) at the share rate of 100 rad/sec at 190° C. satisfying following formula (1).

$$\eta < 1550 \times MFR^{-0.25} - 420 \tag{1}$$

When the above preferable ethylene-α-olefin copolymer is used, an extrusion torque of the copolymer decreased, and extrusion molding processability became more stable.

It is more preferable that MFR and 77 at the share rate of 100 rad/sec at 190° C. satisfy following formula (1'), it is further preferable that MFR and 77 satisfy following formula (1''), and it is most preferable that MFR and 77 satisfy following formula (1''').

$$\eta < 1500 \times MFR^{-0.25} - 420 \tag{1'}$$

$$\eta < 1450 \times MFR^{-0.25} - 420 \tag{1''}$$

$$\eta < 1350 \times MFR^{-0.25} - 420 \tag{1'''}$$

The ethylene-α-olefin copolymer of the present invention has a molecular weight distribution of preferably from 7.0 to 25, more preferably from 7.5 to 20, and most preferably from 8.5 to 17, from the viewpoint of extrusion torque, extrusion molding processability, fuming during extrusion molding processing, and flowability. The above-mentioned molecular weight distribution is a value obtained by calculating the weight-average molecular weight (Mw) and the number-average molecular weight (Mn) each converted into polystyrene molecular weight the chain length distribution obtained by the above-mentioned gel permeation chromatography measurement, and dividing Mw by Mn (Mw/Mn).

Generally, it is known that there is a relationship between MFR and MT of the copolymer of ethylene and α-olefin, and that MT is decreasing with increase of MFR. The preferable ethylene-α-olefin copolymer used in the present invention is a copolymer of which MFR and MT at 190° C. (cN) satisfy the relation of the following formula (2).

$$2 \times MFR^{-0.59} < MT < 40 \times MFR^{-0.59} \tag{formula (2)}$$

The conventional copolymer of ethylene and α-olefin usually does not satisfy the lest side of the formula (2). From the viewpoint of extrusion molding processability, a copolymer of ethylene and α-olefin satisfying the left side of the formula (2) is preferable, and from the viewpoint of processapility during winding up film at high speed, a copolymer of ethylene and α-olefin satisfying the right side of the formula (2) is preferable.

The more preferable relational formula satisfied by the ethylene-α-olefin copolymer in the present invention, $$2.2 \times MFR^{-0.59} < MT < 25 \times MFR^{-0.59} \tag{formula (2')},$$

the further preferable is, $$2.5 \times MFR^{-0.59} < MT < 15 \times MFR^{-0.59} \tag{formula (2'')}.$$

Generally, it is known that there is a relationship between MFR and intrinsic viscosity of the copolymer of ethylene and α-olefin, and that intrinsic viscosity is decreasing with increase of MFR. A copolymer of ethylene and α-olefin used in the present invention has lower intrinsic viscosity than that of the conventional copolymer at comparing the same MFR, and from the viewpoint of lower extrusion torque and extrusion molding processability, the preferable ethylene-α-olefin copolymer used in the present invention is a copolymer of which MFR and intrinsic viscosity ([η]:dl/g) satisfy the relation of the following formula (3).

$$1.02 \times MFR^{-0.094} < [\eta] < 1.50 \times MFR^{-0.156} \tag{formula (3)}$$

From the viewpoint of impact strength, a copolymer of ethylene and α-olefin satisfying the left side of the formula (3) is preferable, and from the viewpoint of suppressing the deterioration of extrusion molding processability due to increase of extrusion torque, a copolymer of ethylene and α-olefin satisfying the right side of the formula (2) is preferable. The more preferable relational formula satisfied by the ethylene-α-olefin copolymer in the present invention is, $$1.05 \times MFR^{-0.094} < [\eta] < 1.47 \times MFR^{-0.156} \quad \text{formula (3')}$$

further preferable is, $$1.08 \times MFR^{-0.094} < [\eta] < 1.42 \times MFR^{-0.156} \quad \text{formula (3'')}.$$

A preferable copolymer of ethylene and α-olefin satisfying used in the present invention is a copolymer having a cold xylene soluble parts (CXS) with higher crystallinity in spite of a slightly larger amount of CXS. When the density of a copolymer of ethylene and α-olefin is low, CXS usually increase, and when its MFR is high, CXS increase.

The preferable ethylene-α-olefin copolymer used in the present invention is a copolymer having CXS satisfying the relation of the following formula (4).

$$10^{(30.3-0.0327 \times d+0.354 \times \log MFR)} < CXS \quad \text{formula (4)}$$

wherein, d is density.

The above-mentioned CXS is determined by the following formula, wherein a soluble part (g) is measured by the method in which 5 g of polymer containing antioxidant is dissolved in 1 l (one liter) of boiling xylene, the solution is cooled to the room temperature for 2 hours and is stand for 20 hours at 25° C. to precipitate insoluble part, and filtrate is recovered by filtration, a solvent is evaporated from the filtrate to obtain the soluble part and weigh it.

$$CXS(\% \text{ by weight}) = [(\text{soluble part (g)}) \times (1/\text{filtrate (liter)})]/5 \text{ g}$$

From the viewpoint of blocking property of film, CXS is usually less than 20.

The copolymer of ethylene and α-olefin produced with a conventional metallocene catalyst such as that without co-catalyst carrier (A) or cross-linking type complex (B) as mentioned later has low CXS, and does not satisfy the left side of formula (4). The copolymer of ethylene and α-olefin in the present invention satisfies the above formula (4), and is excellent in extrusion molding processability due to low extrusion torque.

The copolymer of ethylene and α-olefin produced with a conventional Ziegler-Natta catalyst prepared from titanium tetrachloride has high CXS with low crystallinity, and the film or sheet thereof is sticky and is not excellent in anti-blocking property.

Since the crystallinity of CXS of the copolymer of ethylene and α-olefin preferably used in the present invention is high, heat of fusion of CSX is preferably not less than 30 J/g and the obtained extruded molded article is not sticky and is excellent in anti-blocking property without. The heat of fusion of CXS is more preferably not less than 50 J/g, further preferably 70 J/g. When the heat of fusion is too large, the appearance of film or sheet may be deteriorated and the heat of fusion is preferably not more than 200 J/g.

The heat of fusion is measured by compacting about 10 mg of CXS as obtained above into an aluminum pan, keeping the sample at 150° C. for 2 minutes, then, cooling the sample down to 40° C. at 5° C./min, keeping the sample at 40° C. for 2 minutes, then, heating at 5° C./min, using a differential scanning type calorimeter DSC-7 type apparatus manufactured by Perkin Elmer, and the heat of fusion is obtained by dividing the total absorption heat from 42° C. to the temperature at which the sample is entirely melted by the weight of the sample compacted in the aluminum pan.

A preferable ethylene-α-olefin copolymer used in the present invention is a copolymer having the chain length A satisfying the following formula (5). The chain length (A) is a chain length at peak position of a logarithm normal distribution curve of a component having the highest molecular weight among logarithm normal distribution curves obtained by dividing a chain length distribution curve obtained by gel permeation chromatography measurement into at least two logarithm normal distribution curves.

$$3.30 < \log A < -0.0815 \times \log(MFR) + 4.05 \quad \text{formula (5)}$$

When an ethylene-α-olefin copolymer satisfies the relation of the above-mentioned formula (5), the copolymer has low extrusion torque and excellent in extrusion molding processability, further, excellent in the appearance of an extrusion molded article such as a film and the like.

The relational formula satisfied by the ethylene-α-olefin copolymer is preferably, $$3.30 < \log A < -0.0815 \times \log(MFR) + 4.03, \quad (5')$$

further preferably, $$3.30 < \log A < -0.0815 \times \log(MFR) + 4.02. \quad (5'')$$

The chain length distribution curve is obtained by gel permeation chromatography measurement under the following conditions.
(1) Apparatus: Waters 150° C. manufactured by Water
(2) Separation column: TOSOH TSKgel GMH-HT
(3) Measuring temperature: 145° C.
(4) Carrier: orthodichlorobenzene
(5) Flow rate: 1.0 mL/min
(6) Injection amount: 500 μL Distribution of chain length distribution curve is conducted as described below.

First, a chain length distribution curve in which weight ratio (y value) dW/d(log Aw) is plotted against log Aw (x value), which is logarithm of chain length Aw, is measured by gel permeation chromatography measurement. The number of data plotted is more than 300 so as to obtain a continuous distribution curve. Next, four logarithm normal distribution curves (x-y curve) having a standard deviation of 0.30 and an arbitrary average value (usually, corresponding to chain length A at peak position) to the above-mentioned x value are added in arbitrary ratio, to produce a synthetic curve. Further, the average value and the ratio are determined so that the squared deviation sum of a difference between y value of the actually measured chain length distribution curve ($y_{obs}$) and that of synthetic curve ($y_{cal}$) is the minimum value, both of which are plotted against the same x value. It is preferable that the squared deviation sum is as small as possible and usually, it is not more than 0.5% of the squared deviation sum of $y_{obs}$.

When the average value and the ratio giving the minimum squared deviation sum are obtained, log A is calculated from chain length A at a peak position of a logarithm normal distribution curve of a component having the highest molecular weight among logarithm normal distribution curves obtained by division into four logarithm normal distribution curves. The ratio of logarithm normal distribution curve of a component having the highest molecular weight is usually not less than 10% of the synthetic curve.

A preferable ethylene-α-olefin copolymer used in the present invention is a copolymer in which characteristic relaxation time at 190° C. (τ; unit is sec) and the above-mentioned MFR satisfy the relation of the following formula (6).

$$2 < \Sigma < 8.1 \times MFR^{-0.746} \quad \text{formula (6)}$$

When an ethylene-α-olefin copolymer satisfies the relation of the above-mentioned formula (4), the copolymer has low extrusion torque and excellent in extrusion molding processability, further, excellent in the appearance of an extrusion molded article such as a film and the like.

The relational formula satisfied by the ethylene-α-olefin copolymer of the present invention is preferably, $$2<\tau<7.9 \times MFR^{-0.746} \quad (6')$$

further preferably, $$2<\tau<7.8 \times MFR^{-0.746} \quad (6'')$$

The characteristic relaxation time (τ) at 190° C. is a numerical value calculated by approximating a master curve with the following cross formula. A master curve is obtained by shifting dynamic viscoelasticity date at each temperature T(K) measured under the following conditions using Rheometrics Mechanical Spectrometer RMS-800 manufactured by Rheometrics as a viscoelasticity measuring apparatus based on the temperature-time superposition theory to give a master curve showing the dependency of dynamic viscosity at 190° C. (η; unit is Pa sec) on shearing speed (ω: unit is rad/sec) Measuring conditions of dynamic viscoelasticity data at each temperature T(K)

(1) Geometry: parallel plate, diameter: 25 mm, plate interval: 1.5 to 2 mm
(2) Strain: 5%
(3) Shearing speed: 0.1 to 100 rad/sec
(4) Temperature: 190, 170, 150, 130° C.

Into a sample, an antioxidant such as Irganox 1076 and the like is previously added in suitable amount (for example, 1000 ppm or more), and measurements are all conducted under nitrogen.

Cross approximation formula $$\eta=\eta 0/[1+(\tau \times \omega)^n]$$

(η0 and n are constants obtained by measurement of dynamic viscoelasticity data of ethylene-α-olefin copolymer, like the characteristic relaxation time r).

As the calculation software for obtaining a master curve and approximation of a cross formula, Rhios V.4.4.4 manufactured by Rheometrics is used.

The melt flow rate ratio (MFRR) of the ethylene-α-olefin copolymer of the present invention is, from the viewpoint of flowability, preferably not less than 60, and an ethylene-α-olefin copolymer having a melt flow rate ratio (MFRR) of 60 or more has low extrusion torque and excellent in extrusion molding processability.

The above-mentioned melt flow rate ratio (MFRR) is a valued obtained by dividing a melt flow rate value measured at 190° C. under a load of 211.82 N (21.60 kg) by a melt flow rate value measured under a load of 21.18 N (2.16 kg) according to JIS K7210-1995. For the above-mentioned melt flow rate measurement, a polymer into which about 1000 ppm of an antioxidant had been previously added was preferably used.

The method of producing an ethylene-α-olefin copolymer of the present invention includes a method in which ethylene and an α-olefin are copolymerized under a hydrogen condition using the following metallocene olefin polymerization catalyst.

The metallocene olefin polymerization catalyst used in producing an ethylene-α-olefin copolymer of the present invention include, for example, a catalyst obtained by contacting a co-catalyst carrier (A), cross-linking type bisindenylzirconium complex (B) and organoaluminum compound (C), and the above-mentioned co-catalyst carrier (A) is a carrier obtained by contacting diethylzinc (a), fluorinated phenol (b), water (c), silica (d) and trimethyldisilazane $(((CH_3)_3Si)_2NH)$ (e).

The amounts of the above-mentioned compounds (a), (b) and (c) are not particularly restricted, and when the molar ratio (a):(b):(c) of the use amounts the compounds is 1:y:z, it is preferable that y and z satisfy substantially the following formula.

$$|2-y-2z|<1$$

In the above-mentioned formula, y represents a number of preferably from 0.01 to 1.99, more preferably from 0.10 to 1.80, further preferably from 0.20 to 1.50, most preferably from 0.30 to 1.00.

Regarding the amount of (d) based on (a), the amount of a zinc atom derived from (a) contained in particles obtained by contact of (a) and (d) is preferably 0.1 mmol or more, more preferably 0.5 to 20 mmol in terms of molar number of zinc atoms contained in 1 g of the resulted particles. Regarding the amount of (e) based on (d), the amount of (e) is preferably 0.1 mmol or more, more preferably 0.5 to 20 mmol per g of (d).

The cross-linking bisindenylzirconium complex (B) is preferably racemi-ethylenebis(1-indenyl)zirconium dichloride, or racemi-ethylenebis(1-indenyl)zirconium diphenoxide.

The organoaluminum compound (C) is preferably triisobutylaluminum or tri-n-octylaluminum.

The use amount of the cross-linking bisindenylzirconium complex (B) is preferably $5 \times 10^{-6}$ to $5 \times 10^{-4}$ mol per g of the co-catalyst carrier (A). The amount of the organoaluminum compound (C) is preferably from 1 to 2000 in terms of the ratio (Al/Zr) of the molar number of an aluminum atom in the organoaluminum compound (C) to the molar number of a zirconium atom in the cross-linking bisindenylzirconium complex (B).

The polymerization method includes, for example, gas phase polymerization, slurry polymerization and bulk polymerization, and gas phase polymerization is preferable.

The gas phase polymerization reaction apparatus is usually an apparatus having a fluidized bed type reaction vessel, and preferably an apparatus having a fluidized bed type reaction vessel having an enlarge portion. A stirring blade may be installed in the reaction vessel.

As the method of feeding components of a metallocene olefin polymerization catalyst used in production of an ethylene-α-olefin copolymer of the present invention, there are usually used a method in which components are fed using an inert gas such as nitrogen, argon and the like, or hydrogen, ethylene and the like under condition of no water, and a method in which components are dissolved or diluted in a solvent and fed in the form of solution or slurry. Components of the catalyst may be individually fed, or any components may be previously contacted in any order before feeding.

It is preferable that, before effecting the polymerization, previous polymerization is conducted, and the previously polymerized catalyst components are used as the catalyst components or catalyst for the polymerization.

The polymerization temperature is usually less than the temperature at which a copolymer is melted, and preferably from about 0 to about 150° C., more preferably from about 30 to about 100° C.

For the purpose of controlling the melt flowability of a copolymer, hydrogen may be added as a molecular weight controlling agent.

A copolymer of ethylene and α-olefin used in the present invention usually introduced into a molding machine in a form of pellet. A pelletizing method includes a method of copolymerization of ethylene and α-olefin under hydrogen using the olefin polymerization catalyst such as mentioned-above metallocene, and then by extruding it with the following continuous-extrusion method.

One of the methods is the method of producing continuously strands using the extruder equipped with the extensional flow mixing (EFM) die developed by Utracki et. al. disclosed in U.S. Pat. No. 5,451,106, cutting continuously the strand, and forming pellets.

Other method is the method of producing continuously strands using a counter rotating twin screw extruder equipped with a gear pump, cutting the strand continuously, and forming pellets. As for the latter, it is preferable that the extruder has a resident zone between the screw zone and a die.

The ethylene-α-olefin copolymer in the present invention may be added by known additives if necessary. Examples of the additives include weather resistant agent, lubricant, anti-blocking agent, antistatic agent, defogging agent, non-dripping agent, pigment, filler and the like.

An anti-blocking agent includes inorganic anti-blocking agent and organic anti-blocking agent. An inorganic anti-blocking agent includes, for example, silica, diatomaceous earth, talc, aluminosilicate, kaoline, and calcium carbonate. An organic anti-blocking agent includes, for example, Epostar-MA (manufactured by Nippon Shokubai Co., Ltd.)

A lubricant include, for example, higher fatty acid amide, higher fatty acid ester. A pigment includes, for example, white pigment and carbon black. An antistatic agent includes, for example, glyceryl ester of fatty acid having from 8 to 22 carbon atoms or glyceryl ester of sorbitan acid, alkyl dialkanol amide of fatty acid having from 8 to 22 carbon atoms, polyethylene glycole ester, and alkyl diethanol amine.

The method of forming a film of the present invention includes a method in which the ethylene-α-olefin copolymer mentioned above or a composition thereof is melted, extruded from a T-die or tubular die to mold into film. In the case of using T-die, a membrane of the molted state of polymer extruded from T-die is cooled by cooling roll to mold into a film (T-die molding process). In the case of using tubular die, a circular membrane of the molted state of polymer extruded from tubular die is cooled by air or water to mold into a film (tubular die molding process).

In the T-die molding process, a temperature of a ethylene-α-olefin copolymer or a composition thereof at the die gap of T-die is not more than 200°, preferably not more than 180° C., more preferably not more than 160° C.

In the tubular die molding process, a temperature of a ethylene-α-olefin copolymer or a composition thereof at the die gap of tubular die is not more than 170° C., preferably not more than 160° C., more preferably not more than 150° C., further preferably 140° C.

Since the ethylene-α-olefin copolymer used in the present invention is excellent in extrusion molding processability and has lower extrusion torque than the conventional ethylene-α-olefin copolymer, melt viscosity of the ethylene-α-olefin copolymer used in the present invention is sufficiently low at the lower molding temperature than usual. Further, since heat generation during extrusion molding is small and the copolymer is less oxidized and less thermally degraded, the obtained film is excellent in a quality of odorless or small deterioration of taste of food contained in a package of the extruded molded article. In the case where the temperature of a ethylene-α-olefin copolymer or a composition thereof at the die gap is higher than the above range, the obtained film is not excellent in a quality of odorless or small deterioration of taste of food contained in a package of the extruded molded article.

The lower limit of the temperature at the die gap is not limited as far as the copolymer of the composition thereof is melted, and usually, the lower limit is 130° C. in the T-die molding process and 125° C. in the tubular die molding process. If the temperature is less than this, it may be difficult to melt the copolymer and extrusion torque may become large.

In the present invention, a temperature of a ethylene-α-olefin copolymer or a composition thereof at the die gap is a temperature of the melted copolymer or composition measured at the outlet of die. Usually, a temperature of a ethylene-α-olefin copolymer or a composition thereof at the die gap is experimentally measured, the conditions for molding including preset temperature of molding machine is determined, and extrusion molding is conducted.

The ethylene-α-olefin copolymer used in the present invention may be added by commercially available anti-oxdant in order to suppress the deterioration of quality caused by oxidation degradation. Since a temperature of a ethylene-α-olefin copolymer or a composition thereof is not more than 200° at the die gap of T-die, or not more than 170° at the die gap of tubular die, generation of oxidants which cause odor or deterioration of taste is suppressed compared to the conventional method. Therefore, it is possible to reduce the added amount of antioxidant or hydrochloric acid absorbing agent. Accordingly, the amount of antioxidant, the amount of hydrochloric acid absorbing agent, or both of them is reduced to be substantially zero.

An example of antioxidant includes an antioxidant of phenolic compound and an antioxidant of phosphoric compound. An antioxidant of phenolic compound includes 2,6-di-tert-butyl-4-methyl-phenol (BHT), n-octadecyl-3-(3,5-di-tert-butyl-4-hydroxyphenyl)-propionate (trade name:Irganox107, manufactured by Chiba Specialty Chemicals Co., Ltd.), pentaerythrityl-tetrakis[3-(3,5-di-tert-butyl-4-hydroxyphenyl)propionate (trade name: Irganox 1010, manufactured by Chiba Specialty Chemicals Co., Ltd.), 1,3,5-tris-(3, 5-di-tert-butyl-4-4-hydroxybenzyl)isocyanurate (trade name: Irganox 3114, manufactured by Chiba Specialty Chemicals Co., Ltd.), 1,3,5-trimethyl-2,4,6-tris(3,5-di-tert-butyl-4-hydroxybenzyl)benzene, 3,9-bis[2-{3-(3-t-butyl-4-hydroxy-5-methylphenyl)-propionyloxy}-1,1-dimethyl-ethyl]-2,4,8,10-tetraoxaspiro-[5-5]undecane (trade name: Sumilizer GA80, manufactured by Sumitomo Chemical Co., Ltd.).

An antioxidant of phosphoric compound includes distearyl pentaerythritol diphosphite (trade name: Adekastab PEP8), tris(2,4-di-tert-butylphenyl)phosphate (trade name: Irgafos 168, manufactured by Chiba Specialty Chemical Co.), bis(2, 4-di-tert-butylpehnyl pentaerythritol diphosphite, tetrakis(2, 4-di-tert-butylphenyl)4,4'-biphenylene diphosphonite (trade name: Sandostab P-EPQ, manufactured by Clariant Japan K.K.), and bis(2-tert-butyl-4-methylphenyl)pentaerythritol diphospite.

A hydrochloric acid absorbing agent includes metal salt of higher fatty acid (so called metallic soap) and an inorganic hydrochloric acid absorbing agent. A metal salt of higher fatty acid (so called metallic soap) includes, for example, calcium stearate and magnesium stearate, and an inorganic hydrochloric acid absorbing agent includes, for example, hydrotalcites (trade name: DHT ($Mg_{4.5}Al(OH)_{18}CO_83.5H_2O$), manufactured by Kyowa Chemical Co.).

The term of "substantially zero" means that an antioxidant or hydrochloric acid absorbing agent is not detected by analysis or it is difficult to determine quantity even if it is detected, and "substantially zero" is usually not more than 0.05 parts by weight to 100 parts by weight of copolymer of ethylene and α-olefin or composition thereof.

From the viewpoint of odor of the obtained molded article, the molded article without both of antioxidant and hydrochloric acid absorbing agent is preferable.

An extrusion molded article of the present invention is film or sheet.

Film obtained by the present invention is used singly as a composite film obtained by laminating it on a substrate.

An example of substrate includes cellophane, paper, textile, aluminum foil, film of polyamide resin such as 6-nylon and 6,6-nylon, film of polyester resin such as polyethylene terephthalate and polybutylene terephthalate, oriented polypropylene film, film of high density polyethylene and medium density polyethylene.

A method of laminating includes dry laminate method, wet laminate method, sand laminate method and hot-melt laminate method.

EXAMPLES

Next, the present invention will be illustrated based on examples and comparative examples, but is not limited by these examples.

(1) Melt Flow Rate (g/10 min.)

The melt flow rate is measured under a load of 21.18 N (2.16 Kg) at 190° C. according to a method defined by JIS K7210-1995.

(2) Density (kg/m$^3$)

Density is measured according to a method A of JIS K 7112-1980.

(3) Molecular Weight Distribution

The molecular weight distribution curve is obtained by gel permeation chromatography measurement under the following conditions. The molecular weight distribution (Mw/Mn) is represented by a ration of weight-average molecular weight and number-average molecular weight.
(1) Apparatus: Waters 150 C manufactured by Water
(2) Separation column: TOSOH TSKgel GMH-HT
(3) Measuring temperature: 145° C.
(4) Carrier: orthodichlorobenzene
(5) Flow rate: 1.0 mL/min
(6) Injection amount: 500 μL (4) An Activation Energy for Melt Flow (kJ/mol)

A master curve is obtained by shifting dynamic viscoelasticity date at each temperature T(K) measured under the following conditions using Rheometrics Mechanical Spectrometer RMS-800 manufactured by Rheometrics as a viscoelasticity measuring apparatus based on the temperature-time superposition theory to give a master curve showing the dependency of dynamic viscosity at 190° C. (η; unit is Pa·sec) on shearing speed (ω: unit is rad/sec). Measuring conditions of dynamic viscoelasticity data at each temperature T(K)
(1) Geometry: parallel plate, diameter: 25 mm, plate interval: 1.5 to 2 mm
(2) Strain: 5%
(3) Shearing speed: 0.1 to 100 rad/sec
(4) Temperature: 190, 170, 150, 130° C.

A sample was added beforehand by antioxidant suce as Irganox 1076 of adequate amount (for example, not less than 1000 ppm) and the measurement was performed under nitrogen atmosphere.

As the calculation software, Rhios V.4.4.4 manufactured by Rheometrics is used, and Ea value when correlation factor $r^2$ obtained in linear approximation is 0.99 or more in Arrhenius type plot log $(a_T)$–(1/T) is used as the activation energy of flow of an ethylene-α-olefin copolymer in the following Arrhenius type equation.

Arrhenius type equation of shift factor ($a_T$)

$$\log(a_T) = Ea/R(1/T - 1/T0)$$

(R is a gas constant, and T0 is a standard temperature (463 K)).

(5) Melt Viscosity (Pa·s)

Melt viscosity at 190° C. (η; unit is Pa·sec) on shearing speed (ω: unit is rad/sec) is obtained from dynamic viscoelasticity data obtained above (4).

(6) Melt Tension (cN)

The melt tension is measured as follows: a melted resin is extruded through an orifice having a diameter of 2.09 mmφ and a length of 8 mm with a piston at an extrusion speed of 5.5 mm/min at 190° C. using a melt tension tester sold from, for example, Toyo Seiki Seisakusho, and the above-mentioned strand is taken up using a roller having a diameter of 50 mm while increasing rotation speed at a rate of 40 rpm/min per minute. A value of tension which the strand shows just before breaking is regarded as the melt tension.

(7) Intrinsic Visocity (dl/g)

A sample solution in which 100 mg of the ethylene copolymer was dissolved at 135° C. in 100 ml of tetralin containing 5% by weight of BHT as a thermal degradation preventing agent was prepared. The relative viscosity (ηrel) at 135° C. was calculated from the descending time of the sample solution and a blank solution, using an Ubbelohde viscometer. Then, the intrinsic viscosity [η] was calculated from the following formula.

$$[\eta] = 23.3 \times \log(\eta rel)$$

(8) Cold Xylene Soluble Portion (CXS, % by Weight)

CXS is measured according to §175.1520 of Code of Federal Regulations, Food and Drugs Administration.

(9) Estimation of Odor by Sensory Test

Sensory test for odor is conducted by eight panelists. Test samples are prepared by placing 5 g of polymer into 1 liter glass bottle without order, the bottle being covered by aluminum foil and heated at 50° C. for one hour, and then cooled at 23° C. for 24 hours in the room.

The result of test is estimated by a total number of point rated by each panelist according to the following definition.
0 point: no odor
1 point: felt slight odor
2 point: felt strong irritating odor

(10) Fish Eye

The frequency of projections (fish eyes) on the surface of the film obtained above was observed visually. When 100 or less fish eyes are found per m$^2$, evaluation is ○, when 100 to 1000 fish eyes are found, Δ, and when 1000 or more fish eyes are found, x.

Example 1

(1-1) Preparation of Co-Catalyst Carrier (A)

1.5 l of tetrahydrofuran and 1.35 l (2.7 mol) of a hexane solution (2 mol/l) of diethyl zinc were charged into a 5-liter four-necked flask in which air was substituted with nitrogen, and cooled to 5° C. A solution such that 0.2 kg (1 mol) of pentafluorophenol was dissolved in 500 ml of tetrahydrofuran was dropped thereinto for 60 minutes. After being dropped, the solution was stirred at a temperature of 5° C. for 60 minutes, heated up to a temperature of 45° C. over 28 minutes and then stirred for 60 minutes. Thereafter, the solution was cooled down to a temperature of 20° C. in an ice bath and 45 g (2.5 mol) of water was dropped thereinto for 90 minutes. After then, the solution was stirred at a temperature of 20° C. for 60 minutes, heated up to a temperature of 45° C. over 24 minutes and then stirred for 60 minutes. And, the solvent was distilled off under a reduced pressure for 120 minutes while heating the solution from 20° C. to 50° C., which was thereafter dried under a reduced pressure at a temperature of 120° C. for 8 hours. As a result, 0.43 kg of a solid product was obtained.

434.6 g of the above-mentioned solid product and 3 l of tetrahydrofuran were charged into a 5-liter four-necked flask in which air was substituted with nitrogen, and were stirred. 0.33 kg of heat-treated silica at a temperature of 300° C. under nitrogen circulation (Sylopol948 manufactured by DEBISON; average particle diameter=61 µm; pore volume=1.61 ml/g; and specific surface area=296 m$^2$/g) was added thereto. The solution was heated to a temperature of 40° C. and stirred for 2 hours to thereafter stand and sediment the solid component, and then an upper slurry layer was removed at a point of time when an interface between a layer of the sedimented solid component and the upper slurry layer was observed. As a washing process, 3 l of tetrahydrofuran was added thereto, and stood after stirring, and sediment the solid component. The upper slurry layer was removed at a point of time when the interface was similarly observed. Such a washing process was repeated five times in total. Thereafter, the solution was dried under a reduced pressure at a temperature of 120° C. for 8 hours to thereby obtain 0.52 kg of a promoter carrier (A).

(1-2) Pre-Polymerization 100 l of butane containing 2.5 mmol/l as a concentration of tri-isobutyl aluminum and 30 l of hydrogen at normal temperature and pressure were charged into an autoclave with a stirrer having an internal volume of 210 l in which air was previously substituted with nitrogen, which autoclave was thereafter heated up to a temperature of 40° C. Further, ethylene was charged thereinto by 0.25 MPa at gas phase pressure in the autoclave to stabilize the interior of the system, and thereafter 500 mmol of tri-isobutyl aluminum, 68 mmol of racemic-ethylenebis(1-indenyl)zirconium diphenoxide and subsequently 0.45 kg of the above-mentioned promoter carrier (A) were added thereinto to start polymerization. Pre-polymerization was performed with heating a temperature of from 40° C. to 50° C. for 3.5 hours in total while continuously supplying ethylene and hydrogen. After the polymerization, ethylene, butane, and hydrogen gas were purged and the solvent was filtered so as to vacuum-dry the produced solid body at room temperature and obtain a pre-polymerization catalyst component such that 33.3 g of an ethylene polymer was pre-polymerized with respect to 1 g of the above-mentioned promoter carrier (A).

(1-3) Continuous Gas Phase Polymerization

Ethylene and 1-hexene were copolymerized by using the pre-polymerization catalyst obtained above with a continuous fluidized-bed gas phase reactor. The conditions of the polymerization were as follows: a temperature of 75° C., a total pressure of 2 MPa, a gas linear velocity of 0.28 m/sec, 1.0% as a molar ratio of hydrogen to ethylene, and 0.8% as a molar ratio of 1-hexene to ethylene; ethylene, 1-hexene and hydrogen were continuously supplied in order to constantly maintain gas composition during the polymerization. The above-mentioned pre-polymerization catalyst and tri-isobutyl aluminum were continuously supplied so as to maintain a total powder weight of 80 kg in the fluidized bed at an average polymerization time of 4 hours and a production efficiency of 23 kg/hour, whereby ethylene 1-hexene copolymerization powder (PE-1) was obtained.

(1-4) Granulating Ethylene 1-hexene Copolymerization Powder (PE-1)

1000 ppm of calcium stearate and 1800 ppm of Sumilizer GP (manufactured by SUMITOMO CHEMICAL CO., LTD.) were added to the powder of ethylene-1-hexene copolymer (PE-1) obtained above so as to be granulated with the use of an extruder LCM100 manufactured by KOBE STEEL, LTD. under the conditions such as a feed speed of 350 kg/hour, the number of screw revolutions of 450 rpm, a gate opening of 4.2 mm, a suction pressure of a gear pump of 0.2 MPa, and a resin temperature of 200 to 230° C., whereby pellets of the ethylene-1-hexene copolymer (PE-1) was obtained. The obtained ethylene-1-hexene copolymer (PE-1) pellets exhibited physical property values shown in Table 1.

(1-5) Film Processing

Pellets of ethylene-1-hexene copolymer (PE-1) was melt-kneaded using a extruder having a screw of 50 mmφ, and subsequently introduced into feed block type T-die (600 mm width, 1.0 mm of a lip gap) and extruded under conditions of a processing temperature (preset temperature of extruder and die) of 160° C., an extrusion rate of 32 kg/hr and processing rate of 21 m/min, to obtain film of 50 µm thickness. Processing data such as resin pressure, mortar torque, and a temperature of melted resin at the outlet of die was observed. The temperature of melted resin was measured with thermocouple thermometer. Processing data and the result of odor test were shown in Table 2.

Example 2

(2-1) Pre-Polymerization

Pre-polymerization was performed in the same manner as Example 1 to obtain a pre-polymerization catalyst such that 16 g of an ethylene-1-butene copolymer was pre-polymerized with respect to 1 g of the above-mentioned promoter carrier (A).

(2-3) Continuous Gas Phase Polymerization

Ethylene and 1-hexene were copolymerized by using the pre-polymerization catalyst obtained above with a continuous fluidized-bed gas phase reactor in the same manner as Example 1, except that 1.4% as a molar ratio of hydrogen to ethylene and 0.9% as a molar ratio of 1-hexene to ethylene were employed to obtain powder of ethylene-1-hexene copolymer (PE-2).

(2-4) Granulating Ethylene 1-hexene Copolymerization Powder (PE-2)

The powder of ethylene-1-hexene copolymer obtained above was granulated without adding any additives by using of a co rotating biaxial extruder with 35 mmφ (TEM-35B manufactured by Toshiba Co., LTD., L/D=32.8, diameter of 37 mm) at 150° C. under nitrogen flow, and the number of screw revolutions of 150 rpm. The obtained pellets of ethylene-1-hexene copolymer (PE-2) exhibited physical property values shown in Table 1.

(2-5) Film Processing

A film was obtained in the same manner as EXAMPLE 1 except using ethyle-1-hexene copolymer (PE-2). Processing data and the result of odor test were shown in Table 2.

Example 3

Pellets of ethylene-1-butene copolymer were obtained in the same manner as (1-1), (1-2), (1-3), and (1-4) of EXAMPLE 1 except using 1-butene as comonomer. The obtained pellets of ethylene-1-hexene copolymer (PE-3) exhibited physical property values shown in Table 1.
Film processing of pellets of ethylene-1-butene copolymer was performed in the same manner as (1-5) of EXAMPLE 1 except that a processing temperature was 160° C. Processing data and the result of odor test were shown in Table 2.

Comparative Example 1

The same procedure as EXAMPLE 1 is repeated except that a processing temperature in (1-5) of EXAMPLE 1 was 230° C. Processing data and the result of odor test were shown in Table 3.

Comparative Example 2

T-die molding process was tried in the same manner as (1-5) of the EXAMPLE 1 except that liner ethylene-1-hexene copolymer (PE-4, Evolue SP2540 manufactured by Evolue Japan Co., Ltd., and sold by Sumitomo Mitsui Polyolefin Company) obtained with the conventional metallocene catalyst as mentioned above was used, but molding was unable to be performed due to resin pressure exceeded upper limit of extruder.
Physical property values of Evolue SP2540 (PE-4) was shown in Table 1.

Comparative Example 3

Film processing was performed in the same manner as (1-5) of the EXAMPLE 1 except that liner ethylene-1-hexene copolymer (PE-4) was used and a processing temperature was 230° C.
Processing data and the result of odor test were shown in Table 3.

Reference Example 1

T-die molding process was tried to obtain film in the same manner as (1-5) of the EXAMPLE 1 except that branched ethylene polymer (PE-5, Sumikathene F200-0, manufactured by Sumitomo Chemical, sold by Sumitomo Mitsui Polyolefin Company) was used and a processing temperature is 180° C., but film was unable to be molded due to draw down property is insufficient and breakage of melted membrane was occurred during the process. Physical property values of Sumikathene F200-0 (PE-5) was shown in Table 1.

Reference Example 2

Film processing was performed in the same manner as (1-5) of the EXAMPLE 1 except that branched ethylene polymer (PE-5, Sumikathene F200-0, manufactured by Sumitomo Chemical, sold by Sumitomo Mitsui Polyolefin Company) was used and a processing temperature is 230° C., but film was unable to be molded due to draw down property is insufficient and breakage of melted membrane was occurred during the process. Processing data and the result of odor test were shown in Table 3.

TABLE 1

| Ethylene-α-olefin copolymer | | PE-1 | PE-2 | PE-3 | PE-4 | PE-5 |
| --- | --- | --- | --- | --- | --- | --- |
| Melt flow rate (MFR) | g/10 min | 2.3 | 5.1 | 1.1 | 3.8 | 2.0 |
| Melt flow rate ratio (MFRR) | — | 87.9 | 68.8 | 110.0 | 16.6 | 54.3 |
| Density (d) | Kg/m$^3$ | 924 | 923 | 922 | 922 | 924 |
| Molecular weight distribution | — | | 11.8 | | 2.3 | 3.4 |
| Activation energy for melt flow (Ea) | KJ/mol | 72 | 66.5 | 71.0 | 30.2 | 64.6 |
| Melt viscosity (μ) | Pa · s | 580 | 420 | 700 | 1480 | 720 |
| The right side of Eq. 1 | | 838 | 611 | 1093 | 690 | 883 |
| Melt tension (MT) | CN | 3.4 | 1.8 | 4.2 | 0.5 | 3.4 |
| The left side of Eq. 2 | | 1.2 | 0.8 | 1.9 | 0.9 | 1.3 |
| The right side of Eq. 2 | | 24.5 | 15.3 | 37.8 | 18.2 | 26.6 |
| Intrinsic viscosity ([μ]) | dl/g | 0.96 | 0.90 | 1.04 | 1.3 | 0.91 |
| The left side of Eq. 3 | | 0.94 | 0.88 | 1.01 | 0.90 | 0.96 |
| The right side of Eq. 3 | | 1.32 | 1.16 | 1.48 | 1.22 | 1.35 |
| Cold xylene soluble part (CXS) | weight % | 3.1 | 4.9 | 3.7 | 1.0 | 2.0 |
| The left side of Eq. 4 | | 1.6 | 2.3 | 1.5 | 2.3 | 1.6 |

(the right side of Eq. 1): $1550 \times MFR^{-0.25} - 420$
(the left side of Eq. 2): $2 \times MFR^{-0.59}$
(the right side of Eq. 2): $40 \times MFR^{-0.59}$
(the left side of Eq. 3): $1.02 \times MFR^{-0.094}$
(the right side of Eq. 3): $1.50 \times MFR^{-0.156}$
(the left side of Eq. 4): $10^{(30.3 - 0.0327 \times d + 0.354 \times \log MFR)}$

TABLE 2

| Ethylene-α-olefin copolymer | | EXAMPEL 1 PE-1 | EXAMPLE 2 PE-2 | EXAMPLE 3 PE-3 | EXAMPLE 4 PE-4 |
|---|---|---|---|---|---|
| Processing temperature | °C. | 160 | 160 | 160 | 160 |
| Extrusion rate | Kg/hr | 32 | 32 | 32 | 32 |
| Processing rate | M/min | 21 | 21 | 21 | 21 |
| A temperature of melted resin at die gap outlet | °C. | 162 | 160 | 163 | 182 |
| Resin pressure | Mpa | 21.7 | 17.8 | 26.2 | 23.0 |
| Motor torque | ampere | 18.2 | 17.8 | 21.0 | 19.5 |
| odor by sensory test | | 2 | 1 | 4 | 5 |

TABLE 3

| Ethylene-α-olefin copolymer | | COMPARATIVE EXAMPEL 1 PE-1 | COMPARATIVE EXAMPLE 2 PE-4 | COMPARATIVE EXAMPLE 3 PE-4 | REFERENCE EXAMPLE 1 PE-5 | REFERENCE EXAMPLE 2 PE-5 |
|---|---|---|---|---|---|---|
| Processing temperature | °C. | 230 | * | 230 | ** | 230 |
| Extrusion rate | Kg/hr | 32 | | 32 | | 32 |
| Processing rate | M/min | 21 | | 21 | | 21 |
| A temperature of melted resin at die gap outlet | °C. | 231 | | 236 | | 232 |
| Resin pressure | Mpa | 13.1 | | 26.6 | | 16.7 |
| Motor torque | ampere | 17.0 | | 24.0 | | 18.5 |
| odor by sensory test | | 9 | | 13 | | 12 |

*Molding was unable to be performed due to resin pressure exceeded upper limit of extruder.
**Film was unable to be molded due to breakage of melted membrane was occurred during the process.

Example 5

Preparation of Catalyst Component (1) Treatment of Silica

Into a 3 liter four-necked flask purged with nitrogen was charged 0.2 kg of silica heat-treated at 300° C. under nitrogen flow (Sylopol 948 manufactured by Devison; average particle size=61 μm; fine pore capacity=1.70 ml/g; specific surface area=291 m²/g), then, 1.2 liter of toluene was added while washing off silica adhered to the wall surface of the flask. The mixture was cooled to 5° C., then, a mixed solution of 84.4 ml (0.4 mmol) of 1,1,1,3,3,3-hexamethyldisilazane and 115 ml of toluene was dropped over 25 minutes. After completion of dropping, the mixture was stirred at 5° C. for 1 hour and at 95° C. for 3 hours and filtrated. Thereafter, washing using a filter was conducted four times at 95° C. with 1.2 liter of toluene. Next, 1.2 liter of toluene was added, then, the mixture was allowed to stand still overnight.

(2) Preparation of Co-Catalyst Carrier (A1)

Into the slurry obtained above was charged 0.550 liter (1.10 mol) of a hexane solution of diethylzinc (2.00 mol/liter) and the mixture was cooled to 5° C. Into this, a solution prepared by dissolving 105 g (0.570 mol) of pentafluorophenol in 173 ml of toluene was dropped over 65 minutes. After completion of dropping, the mixture was stirred at 5° C. for 1 hour. Then, the mixture was heated to 40° C., and stirred for 1 hour. The temperature was lowered to 5° C. in an ice bath, then, 14.9 g (0.828 mol) of H₂O was dropped over 90 minutes. After completion of dropping, the mixture was stirred at 5° C. for 1.5 hours and at 40° for 2 hours. Then, the mixture was allowed to stand still overnight at room temperature. Thereafter, the mixture was stirred at 80° for 2 hours, then, allowed to stand still to cause precipitation of solid components, and when the interface of a layer of the precipitated solid components and an upper layer, slurry part was observed, the upper layer, slurry part was removed, then, the remaining liquid component was filtrated through a filter, then, to this was added 1.7 liter of toluene and the mixture was stirred at 95° for 2 hours. Thereafter, the mixture was stirred with 1.7 liter of toluene at 95° C. four times and with 1.7 liter of hexane at room temperature twice, respectively, then, allowed to stand still to cause precipitation of solid components, and when the interface of a layer of the precipitated solid components and an upper layer, slurry part was observed, the upper layer, slurry part was removed, then, washing of filtrating the remaining liquid component with a filter was conducted. Then, the solid components were dried under reduced pressure at room temperature for 3 hours to obtain 0.39 kg of a co-catalyst carrier (A1).

[Preparation of Polymerization Pre-Catalyst]

Into a previously nitrogen-purged autoclave having a content volume of 210 liter equipped with a stirrer was charged 100 liter of butane containing triisobutylaluminum at a concentration of 2.5 mmol/liter, 0.5 liter of 1-butene and 8 liter of hydrogen under normal temperature and normal pressure, then, the autoclave was heated up to 23° C. Further, ethylene was charged in an amount corresponding to 0.2 MPa of gas phase pressure in the autoclave, and after stabilization in the system, 250 mmol of triisobutylaluminum, 30 mmol of racemi-ethylenebis(1-indenyl)zirconium diphenoxide, subsequently, 0.20 kg of the above-mentioned co-catalyst carrier (A1), were added to initiate polymerization. The mixture was heated up to 30° C. and, previous polymerization at 30° C. for a total time of 4 hours was conducted while continuously feeding ethylene and hydrogen. After completion of polymerization, ethylene, butane, hydrogen gas and the like were purged and the remaining solid was dried under vacuum at room temperature, to obtain a catalyst component in which 13 g of ethylene-1-butene copolymer had been previously polymerized per g of the above-mentioned co-catalyst carrier (A1).

[Polymerization]

Using the polymerized pre-catalyst component obtained above, copolymerization of ethylene and 1-hexene was conducted in a continuous type fluidized bed gas phase polymerization apparatus. The polymerization conditions included a temperature of 75° C., a total pressure of 2 MPa, a gas linear velocity of 0.24 m/second, a hydrogen molar ratio to ethylene of 1.6% and a 1-hexene molar ratio to ethylene of 1.0%, and during the polymerization, ethylene, 1-hexene and hydrogen were continuously fed for maintaining the gas composition constant. The above-mentioned previously polymerized catalyst component and tri-isobutylaluminum were fed continuously, and an ethylene-1-hexene copolymer was obtained at an average polymerization time of 4 hr and a production efficiency of 23 kg/hr, so as to maintain a total powder weight in the fluidized bed of 80 kg constant. To the powder of ethylene-1-hexene copolymer thus obtained, 1000 ppm of calcium stearate and 1800 ppm of Sumilizer GP (manufacture by Sumitomo Chemical) were added, the mixture obtained was extruded with LCM100 extruder (manufactured by Kobe Steel.) under the such as a feed speed of 350 kg/hour, the number of screw revolutions of 450 rpm, a gate opening of 4.2 mm, a suction pressure of a gear pump of 0.2 MPa, and a resin temperature of 200 to 230° C., whereby pellets of the ethylene-1-hexene copolymer was obtained. The obtained ethylene-1-hexene copolymer pellets exhibited physical property values shown in Table 4.

[Film Processing]

The ethylene-α-olefin copolymer obtained above was processed using a full flight type screw mono-axial extruder of 30 mmφ and L/D=28 manufactured by Placo K.K., a die of 50 mmφ and a lip gap of 0.8 mm, and a double slit air ring, under conditions of a processing temperature as shown in Table 4, an extrusion rate of 5.5 kg/hr, a frost line distance (FLD) of 200 mm and a blow ratio of 1.8, to obtain a film having a thickness of 50μ.

A resin pressure during film processing was measure as an index of extrusion torque during film processing. Processing data were shown in Table 4. A film molded at the lower temperature than usual showed the odor level and appearances as shown in Table 4.

Comparative Example 4

Ethylene-α-olefin copolymer obtained in EXAMPLE 5 was molded into a film under the conditions as shown in Table 4.

The obtained film showed odor level and appearance as shown in Table 4.

Comparative Example 5

Catalyst Component

A reactor made of SUS having a content volume of 180 liter equipped with a stirrer and jacket was purged with nitrogen, then, 9.7 kg of silica heat-treated at 300° C. under nitrogen flow (Sylopol 948 manufactured by Devison; fine pore capacity=1.65 ml/g; specific surface area=298 m²/g, average particle size=58 μm) and 100 liter of toluene were added. After cooling to 2°, 23.3 kg (75.9 mol per A1) of a toluene solution of PMAO (PMAO-s manufactured by Toso Finechem) was dropped over 62 minutes. After completion of dropping, the mixture was stirred at 5° C. for 30 minutes, heated up to 95° C. over 2 hours, and stirred for 4 hours at 95° C. Thereafter, the temperature was lowered to 40° C., and carried to a reactor made of SUS purged with nitrogen having a content volume of 180 liter equipped with a stirrer and jacket. The silica-derived component was precipitated over 50 minutes, and the upper layer, slurry component was removed. Thereafter, 100 liter of toluene was added and the mixture was stirred for 10 minutes, then, precipitation was caused over about 45 minutes, and the upper layer, slurry component was removed. The above-mentioned washing operation was repeated three times in total. Next, the slurry was carried to a filter apparatus made of SUS having a content volume of 430 liter purged with nitrogen equipped with a filter, stirrer and jacket, with 120 liter of toluene. Stirring was conducted for 10 minutes and filtration was conducted, 100 liter of toluene was added and the mixture was again stirred for 10 minutes, and filtration was conducted. Further, 100 liter of hexane was added and the mixture was stirred for 10 minutes, and filtration was conducted. This washing operation was repeated twice in total. The slurry was carried to a drying apparatus made of SUS having a content volume of 210 liter purged with nitrogen equipped with a stirrer and jacket, with 70 liter of hexane. Next, drying under nitrogen flow was conducted for 7.5 hours at a jacket temperature of 80°, to obtain 12.6 kg of a catalyst component (S).

[Preparation of Polymerization Pre-Catalyst]

Into a previously nitrogen-purged autoclave having a content volume of 210 liter equipped with a stirrer was charged 120 liter of butane containing tri-isobutylaluminum at a concentration of 2.5 mmol/liter, and 40 liter of hydrogen under normal temperature and normal pressure, then, the autoclave was heated up to 470. Further, ethylene was charged in an amount corresponding to 0.3 MPa of gas phase pressure in the autoclave, and after stabilization in the system, 300 mmol of triisobutylaluminum, 15 mmol of racemi-ethylenebis(1-indenyl)zirconium dichloride, subsequently, 0.25 kg of the catalyst carrier (S) obtained above, were added to initiate polymerization, and previous polymerization for a total time of 4 hours was conducted while continuously feeding ethylene and hydrogen. After completion of polymerization, ethylene, butane, hydrogen gas were purged, then, the produced solid was dried under vacuum at room temperature, to obtain a catalyst component in which 33 g of polyethylene had been previously polymerized per g of the above-mentioned catalyst component (S).

[Polymerization]

Using the previously polymerized catalyst component obtained above, copolymerization of ethylene and 1-hexene was conducted in a continuous type fluidized bed gas phase polymerization apparatus under conditions of a hydrogen molar ratio to ethylene in polymerization of 0.15% and a 1-hexene molar ratio to ethylene of 1.8%, in the same manner as in Example 5. To the powder of ethylene-1-hexene copolymer thus obtained, 1000 ppm of calcium stearate and 1800 ppm of Sumilizer GP (manufacture by Sumitomo Chemical) were added, the mixture obtained was extruded with a full flight type screw mono-axial extruder of 40 mmφ and L/D=28 extruder (manufactured by Tanabe Plastic Company) under the number of screw revolutions of 80 rpm, and at molding temperature of 150° C., whereby pellets of the ethylene-1-hexene copolymer was obtained. The obtained ethylene-1-hexene copolymer pellets was molded into film under usual conditions. The obtained film exhibited the odor level and appearances as shown in Table 4.

Comparative Example 6

Film processing was performed in the same manner as in EXAMPLE 5 except that ethylene-1-hexene copolymer (Sumikathene E FV403, manufactured by Evolue Japan Co., Ltd. metallocene catalyst) was used at the usual temperature. As shown in Table 4, the resin pressure was high, melt tension was low and extrusion processability was insufficient.

It is apparent from Table 3 and 4 that the film obtained by the method of the present invention exhibit excellent in a quality of odorless or free from deteriorating taste of food contained in a package.

ylene-1-hexene copolymer was obtained at an average polymerization time of 4 hr and a production efficiency of 23 kg/hr, so as to maintain a total powder weight in the fluidized bed of 80 kg constant. The obtained powder without adding antioxidant or hydrochloric acid absorbing agent was extruded with LCM100 extruder (manufactured by Kobe Steel.) under the such as a feed speed of 350 kg/hour, the number of screw revolutions of 450 rpm, a gate opening of 4.2 mm, a suction pressure of a gear pump of 0.2 MPa, and a resin temperature of 200 to 230° C., whereby pellets of the ethylene-1-hexene copolymer was obtained. The obtained ethylene-1-hexene copolymer pellets exhibited physical property values shown in Table 5. The pellets obtained above was processed using a full flight type screw mono-axial extruder of 30 mmφ and L/D=28 manufactured by Placo K.K., a die of 50 mmφ and a lip gap of 0.8 mm, and a double slit air ring, under conditions of a processing temperature of 170° C., an

TABLE 4

|  | EXAMPLE 5 | COMPARATIVE EXAMPLE 4 | COMPARATIVE EXAMPLE 5 | COMPARATIVE EXAMPLE 6 |
|---|---|---|---|---|
| Melt flow rate (g/10 min) | 2.18 | 2.18 | 2.23 | 3.7 |
| Melt flow rate ratio (MFRR) | 67 | 67 | 50 | 17 |
| Density (Kg/m$^3$) | 919.8 | 919.8 | 919.6 | 919 |
| Mw/Mn | 9.2 | 9.2 | 3.9 | 2.4 |
| Ea (KJ/mol) | 69 | 69 | 41 | 33 |
| Melt viscosity μ (Pa · s) | 600 | 600 | 850 | 1470 |
| The right side of Eq. 1 | 826 | 826 | 818 | 668 |
| Melt tension MT (CN) | 5.5 | 5.5 | 2.7 | 0.4 |
| The left side of Eq. 2 | 1.3 | 1.3 | 1.3 | 0.9 |
| The right side of Eq. 2 | 25 | 25 | 25 | 18 |
| [μ] (dl/g) | 0.96 | 0.96 | 1.12 | 1.28 |
| The left side of Eq. 3 | 0.95 | 0.95 | 0.95 | 0.90 |
| The right side of Eq. 3 | 1.33 | 1.33 | 1.32 | 1.22 |
| CXS (wt %) | 3.7 | 3.7 | 2.1 | 1.0 |
| The right side of Eq. 4 | 2.2 | 2.2 | 2.3 | 2.8 |
| Log A | 3.87 | 3.87 | 4.05 | — |
| The right side of Eq. (5) | 4.02 | 4.02 | 4.02 | — |
| τ(0) sec | 2.4 | 2.4 | 5.9 | 0.01 |
| The right side of Eq. (6) | 4.5 | 4.5 | 4.5 | 3.05 |
| Resin temperature at die gap (° C.) | 136 | 173 | 178 | 183 |
| Resin pressure (Mpa) | 29 | 21 | 25 | 35 |
| Odor[1] | ○ | X | X |  |
| Fish eye | ○ | ○ | X |  |

(the right side of Eg. (5)): $-0.0815 \times \log(MFR) + 4.05$
(the right side of Eq. (6)): $8.1 \times MFR^{-0.746}$

[1] ○ means the total points is less than 8. X means the total points is not less than 8.

Example 6

Using the polymerized pre-catalyst component obtained by Example 5, copolymerization of ethylene and 1-hexene was conducted in a continuous type fluidized bed gas phase polymerization apparatus. The polymerization conditions included a temperature of 75° C., a total pressure of 2 MPa, a gas linear velocity of 0.24 m/second, a hydrogen molar ratio to ethylene of 1.0% and a 1-hexene molar ratio to ethylene of 1.0%, and during the polymerization, ethylene, 1-hexene and hydrogen were continuously fed for maintaining the gas composition constant. The polymerized pre-catalyst component and tri-isobutylaluminum were fed continuously, and an ethextrusion rate of 5.5 kg/hr, a frost line distance (FLD) of 200 mm and a blow ratio of 1.8, to obtain a film having a thickness of 50μ.

A resin pressure during film processing was measure as an index of extrusion torque during film processing.

Comparative Example 7

As shown in Table 5, LDPE F200-0 obtained by high pressure method (manufactured by Sumitomo Chemical Co., Ltd.) showed high rein pressure during film processing and insufficient film processability, and its odor level is not good.

TABLE 5

|  | EXAMPLE 6 | COMPARATIVE EXAMPLE 5 | COMPARATIVE EXAMPLE 7 |
|---|---|---|---|
| Melt flow rate (g/10 min) | 2.1 | 2.23 | 2.1 |
| Melt flow rate ratio (MFRR) | 94 | 50 | 54 |
| Density (Kg/m$^3$) | 924.2 | 919.8 | 923.7 |
| Mw/Mn | 9.2 | 3.9 | 3.4 |
| Ea (KJ/mol) | 72 | 41 | 65 |
| Melt viscosity μ (Pa · s) | 580 | 850 | 720 |
| The right side of Eq. 1 | 845 | 818 | 838 |
| Melt tension MT (CN) | 4.6 | 2.7 | 3.2 |
| The left side of Eq. 2 | 1.3 | 1.3 | 1.3 |
| The right side of Eq. 2 | 26 | 25 | 26 |
| [μ] (dl/g) | 0.96 | 1.12 |  |
| The left side of Eq. 3 | 0.95 | 0.95 |  |
| The right side of Eq. 3 | 1.33 | 1.32 |  |
| CXS (wt %) | 3.7 | 2.1 |  |
| The right side of Eq. 4 | 1.3 | 2.3 |  |
| Resin temperature at die gap (° C.) | 136 | 173 | 178 |
| Resin pressure (Mpa) | 19 | 25 | 28 |
| odor | ○ | X | X |
| Log A | 3.89 | 4.05 |  |
| The right side of Eq. (5) | 4.02 | 4.02 |  |
| τ(0) sec | 3.2 | 5.9 |  |
| The right side of Eq. (6) | 4.7 | 4.5 |  |
| Fish eye | ○ | X | X |

(the right side of Eq. (5)): $-0.0815 \times \log(MFR) + 4.05$
(the right side of Eq. (6)): $8.1 \times MFR^{-0.746}$
[1]) ○ means the total points is less than 8. X means the total points is not less than 8.

According to the present invention, a film excellent in a quality of odorless or free from deteriorating taste of food contained in a package of the extruded molded article by using an ethylene-α-olefin copolymer excellent in extrusion molding processability is obtained.

What is claimed is:

1. A method for producing an extruded molded article comprising a step of extruding a copolymer of ethylene and α-olefin of from 3 to 20 carbon atoms having an activation energy for melt flow of not less than 50 kJ/mol under one of the following conditions:
   (a) a temperature of melted resin at die gap of T-die is not more than 200° C.,
   (b) a temperature of melted resin at die gap of tubular tie is not more than 170° C.

2. The method according to claim 1, wherein
   (i) the copolymer of ethylene and α-olefin of from 3 to 20 carbon atoms has a melt flow rate (MFR) and melt viscosity (η) at the share rate of 100 rad/sec at 190° C. satisfying following formula (1)

$$\eta < 1550 \times MFR^{-0.25} - 420 \quad (1),$$

(ii) the copolymer of ethylene and α-olefin of from 3 to 20 carbon atoms has molecular weight distribution of from 7 to 25,
   (iii) the copolymer of ethylene and α-olefin of from 3 to 20 carbon atoms has a MFR and melt tension (MT, unit is cN) at 190° C. satisfying following formula (2), and has MFR and intrinsic viscosity ([η], unit is dl/g) satisfying following formula (3)

$$2 \times MFR^{-0.59} < MT < 40 \times MFR^{-0.59} \quad (2)$$

$$1.02 \times MFR^{-0.094} < [\eta] < 1.50 \times MFR^{-0.156} \quad (3),$$

or
   (iv) the copolymer of ethylene and α-olefin of from 3 to 20 carbon atoms has a MFR and melt tension (MT, unit is cN) at 190° C. satisfying following formula (2), and has a MFR and intrinsic viscosity ([η], unit is dl/g) satisfying following formula (3)

$$2 \times MFR^{-0.59} < MT < 40 \times MFR^{-0.59} \quad (2)$$

$$1.02 \times MFR^{-0.094} < [\eta] < 1.50 \times MFR^{-0.156} \quad (3)$$

and
   wherein the copolymer also satisfies at least one of the aforesaid (i) or (ii).

3. An extruded molded article comprising a copolymer of ethylene and α-olefin of from 3 to 20 carbon atoms having a melt flow rate of 1.1 to 100 g/10 minutes, measured under a load of 21.18 N at 190° C. according to a method defined by JIS 7210-1995, an activation energy for melt flow of not less than 50 kJ/mol, and a molecular weight distribution of from 7 to 25, and being substantially free from at least one of an antioxidant and a hydrochloric acid absorbing agent.

4. The extruded molded article according to claim 3, wherein the extruded molded article is substantially free from both an antioxidant and a hydrochloric acid absorbing agent.

5. The extruded molded article according to claim 3, wherein the content of one of an antioxidant and a hydrochloric acid absorbing agent is not more than 0.05 parts by weight to 100 parts by weight of a copolymer of ethylene and α-olefin of from 3 to 20 carbon atoms.

6. The extruded molded article according to claim 4, wherein the contents of both an antioxidant and a hydrochloric acid absorbing agent are not more than 0.05 parts by weight to 100 parts by weight of a copolymer of ethylene and α-olefin of from 3 to 20 carbon atoms.

7. The extruded molded article according to claim 3, wherein the copolymer of ethylene and α-olefin of from 3 to 20 carbon atoms has a melt flow rate (MFR) and melt viscosity (η) at the share rate of 100 rad/sec at 190° C. satisfying following formula (1)

$$\eta < 1550 \times MFR^{-0.25} - 420 \quad (1).$$

8. The extruded molded article according to any one of claims 4-7, wherein the copolymer of ethylene and α-olefin of from 3 to 20 carbon atoms has a MFR and melt tension (MT, unit is cN) at 190° C. satisfying formula (2):

$$2 \times MFR^{-0.59} < MT < 40 \times MFR^{-0.59} \quad (2),$$ and a MFR and intrinsic viscosity ([η], unit is dl/g) satisfying following formula (3):

$$1.02 \times MFR^{-0.094} < [\eta] < 1.50 \times MFR^{-0.156} \quad (3).$$

9. The extruded molded article according to claim 3, wherein the extruded molded article is film.

10. The extruded molded article according to claim 9, wherein the film is obtained by T-die molding process.

11. The extruded molded article according to claim 9, wherein the film is obtained by tubular die molding process.

* * * * *